3,380,856
METHOD OF MAKING FUEL CELL ELECTRODES COMPRISED OF BORIDES, CARBIDES, NITRIDES AND/OR SILICIDES OF ONE OR MORE TRANSITION METALS

Franz Arthur Pohl, Langen, Germany, assignor to Licentia Patent - Verwaltungs - G.m.b.H., Frankfurt am Main, Germany
No Drawing. Filed June 14, 1965, Ser. No. 463,915
Claims priority, application Germany, June 12, 1964, L 48,034; Nov. 3, 1964, L 49,183
5 Claims. (Cl. 136—120)

The present invention relates to electrodes, and, more particularly, to electrodes for fuel cells and their manufacture.

There exist many more or less efficient ways in which electrical energy can be obtained. One of the more important ways, and one which has recently acquired increasing significance, involves the use of fuel cells in which the chemical energy of fuels is converted into electrical energy. This way of obtaining electrical energy has been found to have substantial commercial significance, particularly as compared to the heretofore customary thermal energy type of cells, which produce electrical energy with a significantly lower efficiency. If, however, any particular type of fuel cell is to gain serious commercial significance and increasingly wider use, a way must be found to reduce the costs for the fuel and the electrode and to provide a fuel cell arrangement which operates optimally under normal conditions.

There exist fuel cells for hydrocarbons, which operate well at low temperatures. While the costs for this commercially available fuel are very low, the electrodes have to be made of platinum or a metal of the platinum group, because the acidic electrolytes quickly destroy electrodes made of other materials, such as catalytic materials, e.g., nickel.

Acidic electrolytes are particularly suited for the electrochemical combustion of hydrocarbons, inasmuch as they, in contradistinction to, for example, alkaline electrolytes, are not changed or consumed by the reaction product, i.e., the carbon dioxide, which is formed. Furthermore, the material of which the electrodes are made should be corrosion-resistant even at elevated temperatures, inasmuch as it is generally advantageous to operate at higher temperatures, since the reaction rate, the diffusion, and so on, rise with the reaction temperature. But even though electrodes made of platinum or of metals of the platinum group have this corrosion resistance, they are simply too expensive to enable them to gain general commercial acceptance.

It is, therefore, the primary object of the present invention to provide inexpensive electrodes for fuel cells which utilize low cost, commercially available fuels and which operate at optimum efficiency, as well as to provide inexpensive ways in which to make such electrodes.

With the above object in view, the present invention resides, basically, in a fuel cell electrode consisting of least in part of at least one material selected from the group consisting of the boride, carbide, nitride and silicide of at least one transition metal selected from the group consisting of titanium, zirconium, hafnium, vanadium, niobium, tantalum, chrominum, molybdenum, tungsten, manganese, iron, cobalt and nickel. The present invention further provides several ways in which to make such a fuel cell electrode.

According to one feature of the present invention, such an electrode is made by forming, on the surface of a porous electrode body, a boride and/or carbide and/or nitride and/or silicide of one or more of the transition metals titanium, zirconium, hafnium, vanadium, niobium, tantalum, chrominum, molybdenum, tungsten, manganese, iron, cobalt and/or nickel, this being done by reacting on the porous electrode body, in a reducing atmosphere and at a sufficiently high temperature, a readily vaporizable, i.e., an easily volatile, boron compound and/or a carbon compound and/or a nitrogen compound and/or a silicon compound together with an easily volatile compound of one or more of the mentioned transition metals.

According to the present invention, the material of which the electrodes are made is thus no longer the expensive platinum, but the boride, carbide, nitride and/or silicide of one or more of the transition elements. These transition elements belong to Groups IVb to VIII of the periodic table and are Ti, V, Cr, Mn, Fe, Co, Ni, Zr, Nb, Mo, Hf, Ta, W These elements are the ones which have the incomplete de-electron shells which are necessary for the chemical sorption and the catalytic action. The boride, carbide, nitride and silicide of these elements are exceptionally corrosion-resistant to both acids and alkali, and are also thermically very stable, this being due to the very high melting points of these borides, carbides, nitrides, and silicides. These otherwise desirable characteristics, however, complicate the manufacture of electrodes from these compounds. According to the present invention, however, the electrodes made of finely porous materials and having boride, carbide, nitride and/or silicide surfaces are made by forming the boride, carbide, nitride and/or silicide of the transition metals on the porous body made of non-conductive, semiconductive or conductive substance, by thermally treating the surfaces of the electrodes with gases and/or vapors. The porous body can, for example, be made by pressing and sintering metal powder of the desired element and of suitable grain size, which powder may or may not contain an additive which itself may be an easily volatile one, as, for example, oxalic acid or ammonium chloride, after which the boride, carbide, nitride and/or silicide of the metal(s) is formed on the surface of the electrode, in a reducing atmosphere, at a sufficiently high temperature.

The boride, nitride, carbide and silicide can, for example, be made by the following chemical reactions.

The boride:

Metal+boron halide+hydrogen→metal boride+hydrogen halide

The carbide:

Metal+hydrocarbon→metal carbide+hydrocarbon

The nitride:

Metal+ammonia→metal nitride+hydrogen

The silicide:

Metal+silicon halide+hydrogen→metal silicide+hydrogen halide

In order to form the boride, carbide, nitride and/or silicide, the pressed bodies which are to carry the boride, carbide, nitride and/or silicide are tempered, in an inert gas atmosphere, at a suitable reaction temperature of between 600° C. and 1300° C., and are exposed to the gas or gas mixture which enables the desired reaction to come about, so that this gas or gas mixture penetrates the pores of this electrode body, thereby to form a surface layer by reacting with the boride, carbide, nitride and/or silicide. It is particularly advantageous if the tempering is carried out in a vacuum, as a result of which the pores of the electrode body are more readily accessible to the gas or gas mixture. These steps of first evacuating and then treating the bodies with the gas or gas mixture are best repeated a number of times, preferably two or three times.

The boride, carbide, nitride and/or silicide, in suitable grain size, can be mixed, pressed, if necessary tempered in a vacuum, and then treated, in the above-described manner, with a gas or gaseous mixture, together with metal powder, of suitable grain size, of the desired metal or metals.

The porous electrodes may also be made by depositing the boride, carbide, nitride and/or silicide of one or more of the above transition elements on a porous and electrically conductive, semiconductive or non-conductive carrier material, as, for example, coal, foam metal, silicon carbide, aluminum oxide, ceramic and the like, the reactions being as follows.

The metal boride:

Metal halide+boron halide+hydrogen→metal boride +hydrogen halide

The metal carbide:

Metal halide + hydrocarbon + hydrogen→metal carbide +hydrocarbon+hydrogen halide The metal nitride:

Metal halide+ammonia→metal nitride+hydrogen halide

The metal silicide:

Metal halide+silicon halide+hydrogen→metal silicide +hydrogen halide

The following are illustrative but not limitative examples of the present invention.

Example I

Titanium powder of a grain size of 30 to 50 microns was pressed, under a pressure of 2 tons/cm.$^2$, into discs having a thickness of 3 mm. and a diameter of 40 mm. These discs were heated in an argon atmosphere to a temperature of 1000° C., this being done in a treating chamber in the form of a quartz tube surrounded by a suitable annular kiln and having an inner diameter of 50 mm. The treating chamber was also provided with suitable supply and exhaust conduits for a treating gas and for connecting a vacuum pump. The tube was then evacuated, at the temperature of 1000° C., to a pressure of $10^{-2}$ torr. Ammonia gas was then introduced and allowed to act at the temperature of 1000° C. for a period of about 10 minutes. The evacuating step and ammonia treating step were then repeated, so that the discs were subjected to each of these steps twice. The treating chamber of the apparatus was then flushed with nitrogen, at a rate of 5 liters/hour, and cooled down to room temperature.

Example II

The electrode was again in the form of a disc, 3 mm. thick and 40 mm. in diameter, and pressed of zirconium powder, in the same manner as described in Example I. Here, the disc was heated, in the inert gas atmosphere, to a temperature of 1100° C., and the treating chamber was evacuated. The gaseous stream of hydrogen containing trichlorosilane was then passed through the apparatus for a period of 10 minutes. The hydrogen was charged with trichlorosilane by passing it over the trichlorosilane at a temperature of 25° C. As here, too, it is advantageous to repeat the evacuation and gas treatment steps, the cycle was repeated three times, after which the electrode was tempered for 30 minutes, at 1100° C., in hydrogen which was passed through the treating chamber at a rate of 5 liters/hour. The electrode was then cooled to room temperature.

Example III

A porous carbon plate was heated, in hydrogen, to a temperature of 1050° C., after which the treating chamber was evacuated. Hydrogen saturated with titanium tetrachloride was then passed through the treating chamber, thereby impregnating the porous surface of the carbon plate. The hydrogen gas was saturated with titanium tetrachloride by passing the hydrogen at a velocity of 10 liters/hour through the titanium tetrachloride, which was in a wash bottle at a temperature of 40° C. In this example, too, the evacuating and treating steps were repeated three times, the treating time with the titanium tetrachloride saturated hydrogen lasting at least 10 minutes. Hydrogen was then passed through the treating chamber, at a rate of 5 liters/hour, and the temperature was raised to 1400° C. After 30 minutes of tempering, the temperature was dropped to room temperature.

According to a further feature of the present invention, the above-described manufacturing process may be simplified by using porous electrode bodies which themselves already consist, to a large extent, of one or more of the borides, carbides, nitrides and/or silicides of one or more of the mentioned transition elements, so that, depending on the amount of these substances already in the electrode bodies, no further deposition of these substances from the vapor phase is necessary, or at least such deposition from the vapor phase as may still be necessary is substantially simplified. Accordingly, the electrode body is made by pressing and sintering one or more of the mentioned boride, carbide, nitride and/or silicide compounds, in powder form, together with a metal powder containing one or more of the mentioned transition elements, with or without soluble or volatile additives, such as sodium chloride, ammonium chloride, or camphor, the proportion of the boride, carbide, nitride and/or silicide of the transition elements being between 10 and 99%, by weight of the mixture, and preferably 75 to 95% by weight, there being, therefore, between 1 and 90%, and preferably 5 to 25%, of the metal powder.

More particularly, a porous electrode body made of a mixture of one or more borides and/or carbides and/or nitrides and/or silicides of one or more of the above-mentioned transition metals, and of a metal powder containing one or more of these transition metals, is pressed and sintered, after which a portion of the free metal is dissolved out.

In practice, the metals and metal borides, metal carbides, metal nitrides and/or metal silicides, which are in powder form and have a grain size of between 1 and 50 microns, and preferably between 5 and 20 microns, are pre-tempered for 30 to 60 minutes, in a hydrogen atmosphere and at a temperature of between 400° C. and 900° C., so as to remove surface oxides. The thus prepared powder is then cooled, either in a protective gas atmosphere or in a vacuum. The metal powder or powders and the powdered metal boride, metal carbide, metal nitride and/or metal silicides are then mixed, in the desired proportions, either with or without an additive such as organic solvents, and are pressed at a pressure of between 1 and 8 tons/cm.$^2$. The sintering temperature is selected so as to be about four-fiifths to five-fifths of the melting temperature of the metal component of the mixture having the lowest melting point. The duration of the sintering depends on the composition of the electrode and lasts between 30 minutes and several hours.

The thus-manufactured electrodes are then activated by anodically dissolving one part of the metallic component or components. In the course of this process, the electrodes intended to serve as cathodes can be activated with a positive voltage to a point near to that at which oxygen is formed. In the case of electrodes intended to serve as anodes, however, the same may have applied to them only a voltage of up to about −150 mv. with respect to a calomel electrode.

The following is illustrative and not limitative of the manufacture of an electrode which itself is made up of a mixture of the metal and the metal boride, carbide, nitride and/or silicide.

Example IV

A mixture was formed, consisting of 90 parts by weight of titanium carbide powder having a grain size of between 10 and 30 microns and 10 parts of titanium metal powder having a grain size of between 5 and 10 microns. This mixture was steeped in a 1% ethereal solution of camphor, and pressed into discs having a diameter of about 40 mm. and a thickness of between 2 and 3 mm. under a pressure of 2 tons/cm.$^2$. The discs were then pre-tempered in a protective gas atmosphere for about 30 minutes at a temperature of 200° C., and then tempered for 2 hours at a temperature of 1700° C. The electrodes were then anodically activated in diluted phosphoric acid.

It will thus be seen that, in accordance with the present invention, fuel cell electrodes can be manufactured inexpensively, so that such cells can be used, commercially, to a large extent, which cells operate with inexpensive fuels and at optimum efficiency. This result is achieved by providing a fuel cell electrode which according to the present invention, consists at least in part of at least one material selected from the group consisting of the boride, carbide nitride and silicide of at least one of the above-mentioned transition metals, i.e., by using at least one of these materials as a fuel cell electrode.

It will be understood that the above description of the present invention is susceptible to various modifications, changes and adaptations, and the same are intended to be comprehended within the meaning and range of equivalents of the appended claims.

What is claimed is:
1. A method of making fuel cell electrodes, comprising the steps of: mixing a first powder consisting of at least one material selected from the group consisting of the boride, carbide, nitride and silicide of at least one transition metal selected from the group consisting of titanium, zirconium, hafnium, vanadium, niobium, tantalum, chromium, molybdenum, tungsten, manganese, iron, cobalt and nickel, with a second powder consisting of at least one of said transition metals; pressing and sintering the mixture for forming a porous electrode body; thereafter dissolving out a portion of the free metal; and anodically activating the electrode in diluted phosphoric acid.

2. A method as defined in claim 1 wherein the proportion of said second powder is between 1 and 90% by weight.

3. A method as defined in claim 1 wherein the proportion of said second powder is between 5 and 25% by weight.

4. A method as defined in claim 1 wherein said first powder, prior to being mixed with said second powder, is treated in a reducing atmosphere at a temperature of between 400° C. and 900° C.

5. A method as defined in claim 1 wherein the pressed electrode body is sintered in an inert gas at a temperature which is between four-fifths and five-fifths of the melting temperature of the metal component of the mixture having the lowest melting point.

References Cited
UNITED STATES PATENTS

| | | | |
|---|---|---|---|
| 2,059,041 | 10/1936 | Schroeter et al. | 75—202 X |
| 2,373,405 | 4/1945 | Lowit | 75—214 X |
| 2,799,912 | 7/1957 | Greger | 75—202 |
| 3,073,717 | 1/1963 | Pyle et al. | 117—106 X |
| 3,090,702 | 5/1963 | Commanday et al. | 117—106 |
| 3,183,123 | 5/1965 | Haworth | 136—120 X |
| 3,198,667 | 8/1965 | Gladrow et al. | 136—122 |
| 3,201,858 | 8/1965 | Valyi | 136—120 |
| 3,264,101 | 8/1966 | Takeya et al. | 75—204 |

FOREIGN PATENTS

| | | |
|---|---|---|
| 476,002 | 8/1951 | Canada. |
| 716,604 | 10/1954 | Great Britain. |

ALLEN B. CURTIS, *Primary Examiner.*

WINSTON A. DOUGLAS, *Examiner.*

N. P. BULLOCH, O. F. CRUTCHFIELD, *Assistant Examiners.*